US009129747B2

(12) United States Patent
Pinwill et al.

(10) Patent No.: US 9,129,747 B2
(45) Date of Patent: Sep. 8, 2015

(54) ABRASIVE BLASTED CATHODE OF A WET ELECTROLYTIC CAPACITOR

(71) Applicant: AVX Corporation, Fountain Inn, SC (US)

(72) Inventors: Ian Pinwill, Devon (GB); David Masheder, Devon (GB)

(73) Assignee: AVX Corporation, Fountain Inn, SC (US)

( * ) Notice: Subject to any disclaimer, the term of this patent is extended or adjusted under 35 U.S.C. 154(b) by 256 days.

(21) Appl. No.: 13/785,036

(22) Filed: Mar. 5, 2013

(65) Prior Publication Data

US 2013/0242468 A1    Sep. 19, 2013

Related U.S. Application Data

(60) Provisional application No. 61/611,738, filed on Mar. 16, 2012.

(51) Int. Cl.
| H01G 9/04 | (2006.01) |
|---|---|
| H01G 9/042 | (2006.01) |
| H01G 4/005 | (2006.01) |
| H01G 9/145 | (2006.01) |

(52) U.S. Cl.
CPC ............. *H01G 9/0425* (2013.01); *H01G 4/005* (2013.01); *H01G 9/145* (2013.01)

(58) Field of Classification Search
USPC ......... 361/516, 517–519, 523, 525, 528–529, 361/530, 508–509; 29/25.01–25.03
See application file for complete search history.

(56) References Cited

U.S. PATENT DOCUMENTS

| 3,956,819 | A | 5/1976 | Augeri |
|---|---|---|---|
| 4,025,827 | A | 5/1977 | Pellerin et al. |
| 4,296,458 | A | 10/1981 | Smith et al. |
| 4,479,168 | A | 10/1984 | Green, Jr. |
| 4,538,212 | A | 8/1985 | Montgomery |
| 4,780,797 | A | 10/1988 | Libby |
| 4,987,519 | A | 1/1991 | Hutchins et al. |
| 4,992,910 | A | 2/1991 | Evans |
| 5,236,627 | A | 8/1993 | Hannecart et al. |
| 5,284,723 | A | 2/1994 | Hannecart et al. |
| 5,369,547 | A | 11/1994 | Evans |
| 5,400,211 | A | 3/1995 | Evans |
| 5,435,874 | A | 7/1995 | Takeuchi et al. |
| 5,469,325 | A | 11/1995 | Evans |
| 5,559,667 | A | 9/1996 | Evans |

(Continued)

OTHER PUBLICATIONS

Search Report for GB1304225.4 dated Aug. 1, 2013, 3 pages.

(Continued)

*Primary Examiner* — Nguyen T Ha
(74) *Attorney, Agent, or Firm* — Dority & Manning, P.A.

(57) ABSTRACT

A wet electrolytic capacitor that includes a porous anode body containing a dielectric layer, an electrolyte, and a cathode containing a metal substrate on which is disposed a conductive coating is provided. Prior to application of the conductive coating, the metal substrate is blasted with abrasive particles to enhance the ability of the substrate to adhere to the coating. The micro-roughened metal substrate can be treated after blasting so that substantially all of the abrasive particles are removed. This is accomplished by contacting the metal substrate with an extraction solution to remove the particles, and also by selectively controlling the nature of the abrasive particles so that they are dispersible (e.g., soluble) in the solution.

27 Claims, 2 Drawing Sheets

(56) References Cited

U.S. PATENT DOCUMENTS

| | | |
|---|---|---|
| 5,571,640 A | 11/1996 | Takeuchi et al. |
| 5,737,181 A | 4/1998 | Evans |
| 5,754,394 A | 5/1998 | Evans et al. |
| 5,786,980 A | 7/1998 | Evans |
| 5,894,403 A | 4/1999 | Shah et al. |
| 5,920,455 A | 7/1999 | Shah et al. |
| 5,926,362 A | 7/1999 | Muffoletto et al. |
| 5,982,609 A | 11/1999 | Evans |
| 6,037,077 A | 3/2000 | Nowaczyk |
| 6,094,339 A | 7/2000 | Evans |
| 6,096,391 A | 8/2000 | Muffoletto et al. |
| 6,110,622 A | 8/2000 | Frysz et al. |
| 6,224,985 B1 | 5/2001 | Shah et al. |
| 6,332,900 B1 | 12/2001 | Muffoletto et al. |
| 6,334,879 B1 | 1/2002 | Muffoletto et al. |
| 6,455,108 B1 | 9/2002 | Muffoletto et al. |
| 6,461,771 B1 | 10/2002 | Frysz et al. |
| 6,468,605 B2 | 10/2002 | Shah et al. |
| 6,576,524 B1 | 6/2003 | Evans et al. |
| 6,594,139 B2 | 7/2003 | Muffoletto et al. |
| 6,594,140 B1 | 7/2003 | Evans et al. |
| 6,599,580 B2 | 7/2003 | Muffoletto et al. |
| 6,707,660 B1 | 3/2004 | Evans et al. |
| 6,721,170 B1 | 4/2004 | Evans et al. |
| 6,740,420 B2 | 5/2004 | Muffoletto et al. |
| 6,790,561 B2 | 9/2004 | Gan et al. |
| 6,801,424 B1 | 10/2004 | Nielsen et al. |
| 6,807,048 B1 | 10/2004 | Nielsen et al. |
| 6,842,328 B2 | 1/2005 | Schott et al. |
| 6,893,777 B2 | 5/2005 | Probst |
| 7,000,297 B2 | 2/2006 | Frustaci et al. |
| 7,002,790 B2 | 2/2006 | Hossick-Schott et al. |
| 7,012,799 B2 | 3/2006 | Muffoletto et al. |
| 7,079,377 B2 | 7/2006 | Schott et al. |
| 7,085,126 B2 | 8/2006 | Muffoletto et al. |
| 7,092,242 B1 | 8/2006 | Gloss et al. |
| 7,099,143 B1 | 8/2006 | Fife et al. |
| 7,110,240 B2 | 9/2006 | Breyen et al. |
| 7,116,547 B2 | 10/2006 | Seitz et al. |
| 7,168,142 B2 | 1/2007 | Nowaczyk |
| 7,169,284 B1 | 1/2007 | Jiang et al. |
| 7,224,576 B2 | 5/2007 | Hossick-Schott |
| 7,244,279 B2 | 7/2007 | Seitz et al. |
| 7,256,982 B2 | 8/2007 | Lessner et al. |
| 7,271,994 B2 | 9/2007 | Stemen et al. |
| 7,301,754 B1 | 11/2007 | Knowles |
| 7,314,685 B2 | 1/2008 | Brown et al. |
| 7,324,329 B2 | 1/2008 | Dweik et al. |
| 7,402,183 B1 | 7/2008 | Jiang |
| 7,456,073 B2 | 11/2008 | Fife et al. |
| 7,474,521 B2 | 1/2009 | Hossick-Schott |
| 7,480,130 B2 | 1/2009 | Fife et al. |
| 7,499,260 B2 | 3/2009 | Schott et al. |
| 7,511,943 B2 | 3/2009 | Fife et al. |
| 7,555,339 B2 | 6/2009 | Nielsen et al. |
| 7,667,954 B2 | 2/2010 | Lessner et al. |
| 7,687,102 B2 | 3/2010 | Hossick-Schott et al. |
| 7,785,741 B2 | 8/2010 | Viavattine |
| 8,017,178 B2 | 9/2011 | Atanasoska et al. |
| 8,023,250 B2 | 9/2011 | Ning et al. |
| 8,279,585 B2 | 10/2012 | Dreissig et al. |
| 8,339,769 B2 | 12/2012 | Schott et al. |
| 8,405,956 B2 | 3/2013 | Dreissig et al. |
| 2008/0007894 A1 | 1/2008 | Seitz et al. |
| 2008/0013257 A1 | 1/2008 | Seitz et al. |
| 2008/0229565 A1 | 9/2008 | Schott et al. |
| 2009/0035652 A1 | 2/2009 | Freitag et al. |
| 2009/0117457 A1 | 5/2009 | Davis et al. |
| 2012/0069490 A1* | 3/2012 | Biler et al. ............... 361/516 |
| 2012/0069491 A1 | 3/2012 | Biler |
| 2012/0069492 A1 | 3/2012 | Biler |

OTHER PUBLICATIONS

Abstract of JPH034512 published on Jan. 10, 1991.

Abstract of JP2001110685 published on Apr. 20, 2001.

Abstract of Article—Carlberg, et al., "Poly(3,4-ethylenedioxythiophene) as Electrode Material in Electrochemical Capacitors," Journal of the *Electrochemical Society*, vol. 144, Issue 4, 1997, pp. L61-L64.

Article—Groenendaal et al., "Poly(3,4-ethylenedioxythiophene) and Its Derivatives: Past, Present and Future," *Advanced Materials*, Dec. 27, 1999, 14 pages.

Article—Naoi et al., "Advanced Polymers as Active Materials and Electrolytes for Electrochemical Capacitors and Hybrid Capacity Systems," *The Electrochemical Society* Interface, Spring 2008, 5 pages.

Product Information from H.C. Starck on BAYTRON® P—Conductive Polymer Products, Baytronics, 2006, 3 pages.

Product Information from SinoDevices for Tantalum Products, 2009, 4 pages, www.sinodevices.com.

Paper—Wet Electrolyte Tantalum Capacitors from Vishay, Sep. 1, 2003, 4 pages, www.vishay.com.

Paper—Wet Tantalum Capacitors Sintered Anode TANTALEX® Capacitors for Operation to + 125° C., Elastomer-Sealed from Vishay, Jun. 19, 2007, 5 pages, www.vishay.com.

Paper—Guide to prepare In-Situ-PEDT-Layers from H.C. Starck, 2008, 2 pages.

Paper—Aldissi et al., "Conducting Polymers in Ultracapacitor Applications," Presented at Conference Proceedings at ANTEC '98, Atlanta, Georgia, Apr. 26-Apr. 30, 1998, 6 pages.

Paper—Čespiva et al., "Tantalum Hybrid® Capacitors—The Capacitors with the Highest Available Power Density in Medium Voltage Range," Dec. 2009, 15 pages.

Paper—Edson et al., "Electrical Properties of a Novel High CV Wet Tantalum Capacitor System," CARTS USA Mar. 30-Apr. 2, 2009, Jacksonville, Florida, 11 pages.

Paper—Ennis et al., "Recent Advances in High Voltage, High Energy Capacitor Technology," General Atomics Energy Products Engineering Bulletin, 16th IEEE International Pulsed Power Conference, Jun. 2007, Albuquerque, New Mexico.

Paper—Evans, "High Energy Density Electrolytic-Electrochemical Hybrid Capacitor," Presented to the 14th Capacitor and Resistor Technology Symposium, Mar. 22, 1994, and published in CARTS '94 Proceedings, 6 pages.

Paper—Evans et al., "Performance of Mil-Type Hybrid Tantalum Capacitors," Presented at the 15th Capacitor and Resistor Technology Symposium (CARTS), Mar. 13-16, 1996, 9 pages.

Paper—Freeman et al., "Reliability and Critical Applications of Tantalum Capacitors," 2007 Electronics Components, Assemblies, and Materials Association, Arlington, VA, USA, Proceedings CARTS Europe 2007 Symposium, Oct.-Nov. 2007, Barcelona, Spain, pp. 193-204.

Paper—Merker et al., "New Conducting Polymer Dispersions for Solid Electrolytic Capacitors," CARTS Europe 2005, Oct. 17-20, 2005, Prague, CZ Republic, 6 pages.

Paper—Merker et al., "Tuning Conducting Polymer Dispersions for High-CV Tantalum Capacitors," CARTS Europe Oct. 29-Nov. 1, 2007, Barcelona, Spain, 6 pages.

Paper—Rudge et al., "Conducting Polymers as Active Materials in Electrochemical Capacitors," Dec. 1993, 38 pages.

Paper—Rudge et al., "Scheme for the Use of Conducting Polymers as Active Materials in Electrochemical Supercapacitors," 1993, 12 pages.

Paper—Sautter, Baytron® and Ampertron®: Conductive and Semiconductive Materials for OLED and Organic Electronics Applications, Dec. 17, 2007, 33 pages.

* cited by examiner

US 9,129,747 B2

ABRASIVE BLASTED CATHODE OF A WET ELECTROLYTIC CAPACITOR

RELATED APPLICATIONS

The present application claims priority to U.S. Provisional Application Ser. No. 61/611,738, filed on Mar. 16, 2012, which is incorporated herein in its entirety by reference thereto.

BACKGROUND OF THE INVENTION

Wet capacitors are increasingly being used in the design of circuits due to their volumetric efficiency, reliability, and process compatibility. Wet capacitors typically have a larger capacitance per unit volume than certain other types of capacitors, making them valuable in high-current, high power and low-frequency electrical circuits. One type of wet capacitor that has been developed is a wet electrolytic capacitor that includes a valve metal anode, a cathode, and a liquid electrolyte. The unit cell voltage in this type of capacitor is generally higher due to the formation of a dielectric metal oxide film over the anode surface. Wet electrolytic capacitors tend to offer a good combination of high capacitance with low leakage current. Another type of wet capacitor is a wet symmetric capacitor in which the anode and cathode are similar in terms of structure and composition. The unit cell voltage in this type of capacitor is generally low due to the inevitable decomposition of the electrolyte at high voltage. Whether electrolytic or symmetric, however, the cathodes of wet capacitors typically include a substrate and a coating that provides high capacitance through a faradic or non-faradic mechanism (e.g., double layer formation). Conventional coatings include activated carbon, metal oxides (e.g., ruthenium oxide), and the like. Unfortunately, however, the coatings can become easily detached under certain conditions, such as in the presence of aqueous electrolytes.

As such, a need remains for a high voltage wet electrolytic capacitor that possesses good mechanical robustness and electrical performance.

SUMMARY OF THE INVENTION

In accordance with one embodiment of the present invention, a method for forming a cathode of a wet electrolytic capacitor is disclosed. The method comprises blasting a metal substrate with a plurality of abrasive particles to form a micro-roughened surface having a plurality of pits. The micro-roughened surface is contacted with an extraction solution, wherein the abrasive particles are dispersed in the extraction solution. Thereafter, a conductive coating is formed on the micro-roughened surface.

In accordance with another embodiment of the present invention, a wet electrolytic capacitor is disclosed that comprises a porous anode body that contains a dielectric layer formed by anodic oxidation; a fluid working electrolyte; and a metal substrate within which the anode and the fluid electrolyte are positioned. The metal substrate defines an interior surface that contains a plurality of pits formed by blasting with abrasive particles. Only about 15% or less of the surface is defined by the abrasive particles. A conductive coating is also disposed on the interior surface of the metal substrate and within the pits thereof.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
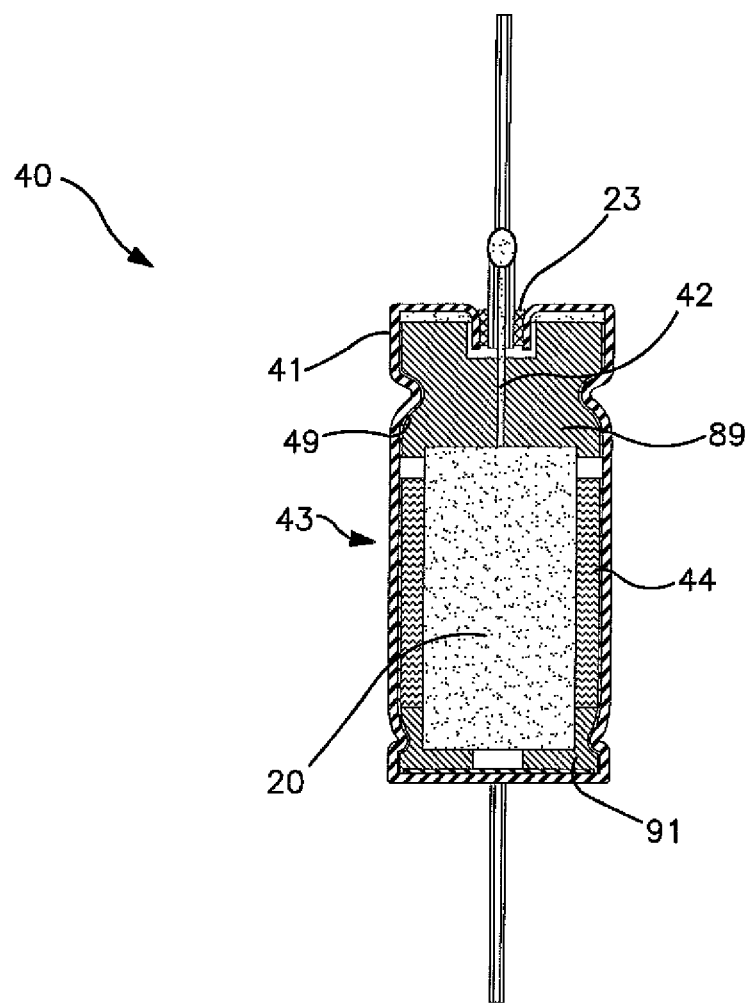
FIG. 1 is a cross-sectional view of one embodiment of the wet electrolytic capacitor of the present invention.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a wet electrolytic capacitor that includes a porous anode body containing a dielectric layer, an electrolyte, and a cathode containing a metal substrate on which is disposed a conductive coating. Prior to application of the conductive coating, the metal substrate is abrasive blasted to enhance the ability of the substrate to adhere to the coating. For example, abrasive blasting can result in a surface that is uniform and macroscopically smooth, thereby increasing the consistency of the conductive coating formed thereon. While possessing a certain degree of smoothness, the abrasive blasted surface is nevertheless micro-roughened so that it contains a plurality of pits. The presence of the pits on the substrate enhances the degree of contact between the conductive coating and metal substrate, thereby resulting in improved mechanical robustness and electrical performance (e.g., reduced equivalent series resistance and leakage current).

The present inventors have also discovered that the micro-roughened metal substrate can be treated after blasting so that substantially all of the abrasive particles are removed. This is accomplished by contacting the metal substrate with an extraction solution to remove the particles, and also by selectively controlling the nature of the abrasive particles so that they are dispersible (e.g., soluble) in the solution. In this manner, any particles that may have been embedded or entrapped within the pits during blasting can be more easily removed through contact with the extraction solution. This increases the number of pits that can remain free for contact with the conductive coating, thereby enhancing the available surface area and degree of surface adhesion between the metal substrate and the conductive coating. The increased surface area allows for increased cathode capacitance for a given size and/or capacitors with a reduced size for a given capacitance. If desired, the abrasive particles may also be conductive so that, oven if a small portion remain on the surface of the substrate, the electrical contact between the metal substrate and conductive coating is not adversely impacted.

Various embodiments of the present invention will now be described in more detail.

I. Cathode

A. Metal Substrate

The metal substrate of the cathode may include any metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. Titanium and tantalum, as well as alloys thereof, are particularly suitable for use in the present invention. The geometric configuration of the substrate may generally vary as is well known to those skilled in the art, such as in the form of a container, can, foil, sheet, screen, mesh, etc. In one embodiment, for example, the metal substrate forms a casing having a generally cylindrical shape. It should be understood, however, that any geometric configuration may be employed in the present invention, such as D-shaped, rectangular, triangular, prismatic, etc. The casing may optionally include a lid that covers the anode and electrolyte, which may be formed from the same or different material than the casing.

Regardless of its particular form, the substrate is micro-roughened by blasting or propelling abrasive particles against at least a portion of a surface of the substrate. As indicated above, the abrasive particles are selected in the present invention so that they are generally dispersible (e.g., soluble) in the extraction solution used to remove the particles. Examples of such particles may include, for instance, ceramic particles, such as those formed from an aluminum oxide, manganese oxide (e.g., manganese dioxide), niobium oxide (e.g., niobium dioxide, niobium monoxide, etc.), etc.; polymeric particles; as well as combinations thereof. Of these, particles that are conductive are particularly suitable for use in the present invention so that they do not adversely impact the electrical path between the conductive coating and substrate, even if they remain on the substrate. Examples of such conductive particles may include, for instance, manganese dioxide, niobium monoxide, niobium dioxide, etc. Manganese dioxide may be particularly suitable as it is conductive and readily soluble in acidic solutions.

The methods employed to blast the surface with the abrasive particles may be selectively controlled to achieve the desired features. Suitable methods may include, for example, sandblasting, bead blasting, pellet blasting, etc. Sandblasting techniques are particularly suitable for use in the present invention and generally involve propelling a stream of the abrasive particles through a nozzle and against the surface of the substrate. The size of the abrasive particles may be selected based on the type of substrate, the pressure employed, and the desired qualities of the finished substrate. For example, the abrasive particles may have an average size of from about 25 to about 200 micrometers, in some embodiments from about 40 to about 150 micrometers, and in some embodiments, from about 50 to about 100 micrometers. Further, the pressure and time that the abrasive particles are propelled toward the surface may range from about 1 to about 50 pounds per square inch, and in some embodiments from about 10 to about 35 pounds per square inch, for a time period of from about 1 to about 50 seconds, in some embodiments from about 5 to about 40 seconds, and in some embodiments, from about 10 to about 30 seconds. At such conditions, the distance that the injection nozzle is spaced from the surface of the metal substrate may also be controlled to achieve the desired pit formation, such as from about 0.1 to about 5 inches from the surface of the substrate. The nozzle may be stationary or it may be moved relative to the substrate during application of the abrasive particles. When blasting the interior surface of a cylindrical casing, for example, the nozzle may be rotated or remain stationary while the casing is rotated. One or more blasting steps may generally be employed.

Once blasting is complete, the metal substrate is contacted with an extraction solution to remove most, if not all, of the abrasive particles remaining on the surface of the metal substrate. This may be accomplished using any of a variety of different techniques, such as by spraying the surface of the substrate with the extraction solution, dipping the substrate into the extraction solution, etc. If desired, the substrate may also be subjected to a vibrational force (e.g., ultrasonic force) before and/or during contact with the extraction solution to help loosen the particles from the surface of the metal substrate.

The nature of the extraction solution is generally such that the abrasive particles are dispersible therein. In this regard, the extraction solution typically contains a solvent (e.g., water) and at least one extraction agent that helps enhance the dispersibility of the particles. The extraction agent(s) may be incorporated into the solution before and/or after it is applied to the metal substrate. Nevertheless, in certain embodiments, the extraction solution is formed prior to application to the metal substrate such that solvents constitute from about 50 wt. % to about 99.5 wt. %, and in some embodiments from about 70 wt. % to about 98 wt. % of the extraction solution, and such that extraction agent(s) constitute from about 0.5 wt. % to about 50 wt. %, and in some embodiments, from about 2 wt. % to about 30 wt. % of the extraction solution. Although a variety of different solvents may be employed, it is often desirable that the solvent is water so that the solution is aqueous. Likewise, a wide variety of extraction agents may be employed depending on the nature of the abrasive particles. For example, one suitable extraction agent is an inorganic acidic compound, such as nitric acid, hydrochloric acid, sulfuric acid, phosphoric acid, boric acid, chromic acid, hydrofluoric acid, etc. Another suitable extraction agent is an inorganic basic compound, such as sodium hydroxide, potassium hydroxide, etc. Other suitable extraction agents may likewise include oxidizing agents and/or reducing agents, such as hydrogen peroxide, formic acid, etc. Once again, however, the specific type of extraction agents selected may vary widely depending on the type of abrasive particles employed. Just as an example, an extraction solution for manganese dioxide particles may be an aqueous solution that contains an inorganic acidic compound (e.g., nitric acid) optionally in conjunction with a reducing agent (e.g., hydrogen peroxide). In another embodiment, an extraction solution for aluminum oxide particles may be an aqueous solution that contains an inorganic basic compound (e.g., sodium hydroxide).

Regardless of the particular nature of the solution, extraction of the abrasive particles in accordance with the present invention can result in a metal substrate having relatively few abrasive particles embedded within the surface. For example, only about 25% or less, in some embodiments about 15% or less, in some embodiments from about 0.05% to about 10%, and in some embodiments, from about 0.1% to about 5% of the surface of the substrate may be defined by the abrasive particles. Stated differently, about 75% or more, in some embodiments about 85% or more, in some embodiments from about 90% to about 99.95%, and in some embodiments, from about 95% to about 99.9%% of the surface of the substrate may be defined by a material of the metal substrate (e.g., tantalum, titanium, etc.). Of course, it should be understood that a portion of the abrasive particles may still reside on the surface without adversely impacting the overall performance of the capacitor, particularly when the abrasive particles are conductive as described above.

If desired, the metal substrate may also be subjected to one or more deoxidation treatments to reduce the content of oxygen on its surface. For example, the substrate may be exposed to a getter material (e.g., magnesium), such as described in U.S. Pat. No. 4,960,471. The temperature at which deoxidation occurs may vary, but typically ranges from about 700° C. to about 1200° C., in some embodiments from about 750° C. to about 1100° C., and in some embodiments, from about 800° C. to about 1000° C. The total time of deoxidation treatment(s) may range from about 20 minutes to about 3 hours. Deoxidation also preferably occurs in an inert atmosphere (e.g., argon). Upon completion of the deoxidation treatment(s), the magnesium or other getter material may form an oxide (e.g., MgO) that can be easily removed using procedures well known to those skilled in the art. After deoxidation, the surface of the metal substrate may contain only about 10% or less, in some embodiments about 8% or less, in some embodiments about 5% or less, and in some embodiments, from about 0.001% to about 3% of oxygen.

While lacking the presence of a substantial amount of abrasive particles, the resulting metal substrate is physically stressed and deformed by the blasting process to such an extent that small pits are formed on the surface. These pits can increase the degree to which the conductive coating is able to adhere to the metal substrate. Further, the blasting process may distribute the pits in a substantially uniform manner so that the surface is generally smooth on a macroscopic level. The surface area of the substrate may also be increased. For instance, the area of the surface of the substrate prior to roughening may range from about 0.05 to about 5 square centimeters, in some embodiments from about 0.1 to about 3 square centimeters, and in some embodiments, from about 0.5 to about 2 square centimeters. The ratio of the area of the micro-roughened surface to that of the initial surface (prior to micro-roughening) may likewise be from about 1 to about 5, and in embodiments, from about 1.1 to about 3. The increase in surface area can allow for increased cathode capacitance for a given size and/or capacitors with a reduced size for a given capacitance.

Figure 2:
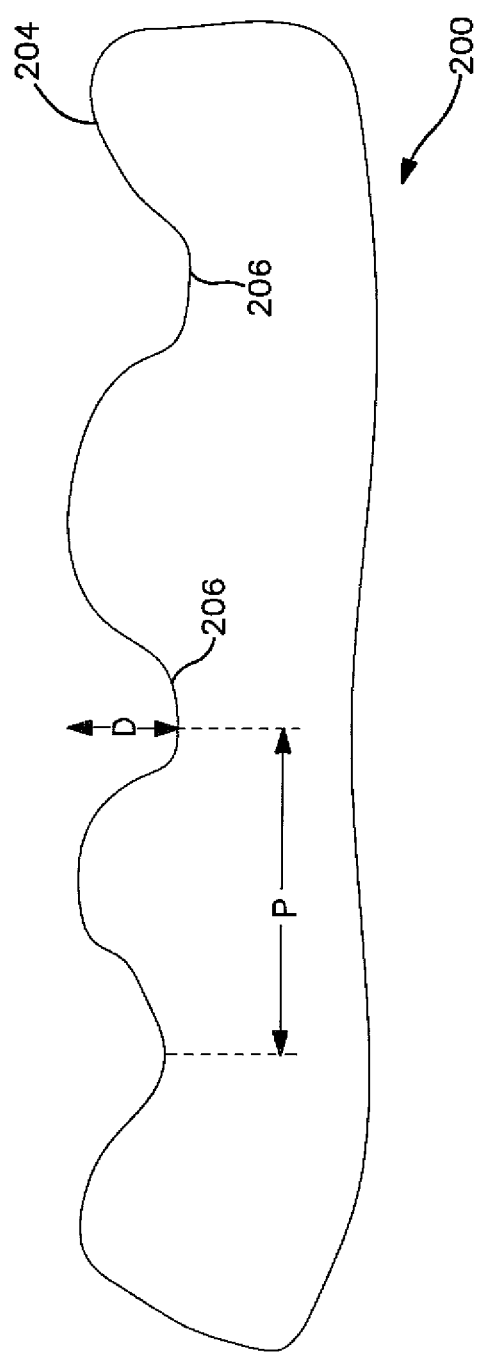
FIG. 2 is a cross-sectional view of one embodiment of an abrasive blasted metal substrate that may be employed in the present invention.

Referring to FIG. 2, for example, one embodiment of a metal substrate 200 is shown that has been abrasive blasted to form a micro-roughened surface 204 having a plurality of pits 206. The relative size and spacing of the pits 206 may vary depending on the desired properties for the capacitor. For example, the average depth ("D") of the pits 206 may be from about 200 to about 2500 nanometers, in some embodiments from about 300 to about 2000 nanometers, and in some embodiments, from about 500 to about 1500 nanometers. Likewise, adjacent pits 206 may be spaced apart a "peak-to-peak" distance ("P") that ranges from about 20 to about 500 micrometers, in some embodiments from about 30 to about 400 micrometers, in some embodiments from about 50 to about 200 micrometers. The number of pits 206 may also be high enough to produce the desired increase in surface area. For example, the surface may possess from 1 to 20, in some embodiments, from 2 to 15, and in some embodiments, from 3 to 10 pits per 100 square micrometers. The pits 206 may be disposed uniformly or non-uniformly across the surface 202. For example, the pits 206 may be present in a spaced-apart fashion over the surface so that they form "island-like" structures. It should be understood that the entire surface of the substrate need not be abraded. In fact, in certain embodiments, it may be desired to only abrade a portion of the metal substrate so that the remaining portion is relatively smooth for attaching a sealing mechanism. For example, a portion of the substrate may be covered by a masking device (e.g., ferrule, tape, etc.) during abrasion so that the pits are formed only in the desired locations. When employing a cylindrical substrate, for instance, it may be desirable to use a generally cylindrical, hollow ferrule to mask a top portion of the substrate.

B. Conductive Coating

As indicated above, a conductive coating is formed on the micro-roughened surface of the metal substrate. Any of a variety of different materials may be employed in the conductive coating to achieve the desired electrochemical activity. In certain embodiments, for example, the conductive coating may include a conductive polymer, such as formed from pyrroles (e.g., pyrrole, alkylpyrroles, etc.), thiophenes (e.g., 3,4-ethylenedioxythiophene), anilines (e.g., alkylanilines, such as methylaniline, and alkoxyanilines, such as methoxyaniline), as well as derivatives and combinations thereof. A single monomer may be employed to form a homopolymer, or two or more monomers may be employed to form a copolymer. In one particular embodiment, for example, the conductive polymer may be a polythiophene having the following general structure:

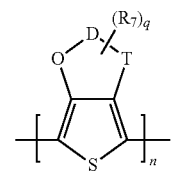

wherein, n is an integer from 1 to 2,000, in some embodiments from 2 to 500, and in some embodiments, from 4 to 350;

T is O or S;

D is an optionally substituted $C_1$ to $C_5$ alkylene radical (e.g., methylene, ethylene, n-propylene, n-butylene, n-pentylene, etc.);

$R_7$ is independently selected from a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0. It should be understood that the $R_7$ group(s) may be bonded to one or more of the carbon atoms of the ring system.

Examples of substituents for the radicals "D" or "$R_7$" include, for instance, hydroxyl, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth. Particularly suitable thiophene monomers are those in which "D" is an optionally substituted $C_2$ to $C_3$ alkylene radical. For instance, the polymer may be an optionally substituted poly(3,4-ethylenedioxythiophene) having the following general structure:

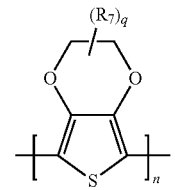

In certain embodiments, q is 0 so that the poly(3,-4-ethylenedioxythiophene) is unsubstituted. In other embodiments, however, q may be from 1 to 2, and in some embodiments, 1, so that the polymer is substituted. For example, the polymer may be an alkyl-substituted poly(3,4-dioxyethylenethiopene) having the following general structure:

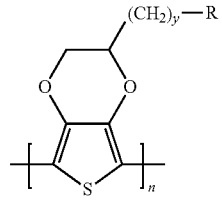

wherein,
n is defined above;
y is from 1 to 10, in some embodiments from 1 to 5, in some embodiments, from 1 to 3, and in some embodiments, from 1 to 2 (e.g., 2); and
R is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical; hydroxyl radical; or a combination thereof. Examples of substituents for the radicals "R" include, for instance, hydroxyl, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth. For instance, the alkyl-substituted poly(3,4-ethylenedioxythiophene) may have the following general structure:

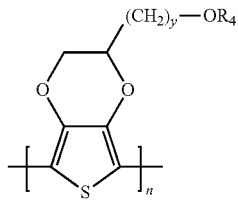

wherein,
n and y are as defined above; and
$R_4$ is hydrogen or an alkyl group. Particular examples of such polymers include hydroxyethylated poly(3,4-ethylenedioxythiophene) (y is 2 and $R_4$ is H) and hydroxymethylated poly(3,4-ethylenedioxthiophene) (y is 1 and $R_4$ is H).
Any of a variety of different techniques may be employed to form the conductive polymer. In one embodiment, for example, precursor monomers may be polymerized on the metal substrate. One suitable type of monomer for forming the polymer may include, for instance, those having the following general structure:

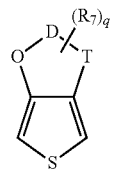

wherein,
T, D, $R_7$, and q are defined above. Particularly suitable thiophene monomers are optionally substituted 3,4-alkylenedioxythiophenes having the general structure:

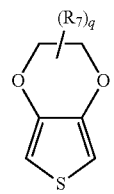

wherein, $R_7$ and q are as defined above. In one particular embodiment, "q" is 0 such that the monomer is 3,4-ethylenedioxythiophene. One commercially suitable example of 3,4-ethylenedioxthiophene is available from Heraeus Clevios under the designation Clevios™ M. Of course, as noted above, derivatives of 3,4-ethylenedioxythiophene may also be employed. The derivatives may be made up of identical or different monomer units and used in pure form and in a mixture with one another and/or with the monomers.
Precursor monomers, such as described above, may be polymerized on the metal substrate using a variety of different techniques. In one embodiment, for example, a precursor monomer is chemically polymerized on the metal substrate in the presence of an oxidative catalyst. The oxidative catalyst employed during chemical polymerization may include a transition metal cation, such as iron(III), copper(II), chromium(VI), cerium(IV), manganese(IV), manganese(VII), ruthenium(III) cations, etc. A dopant may also be employed to provide excess charge to the conductive polymer and stabilize the conductivity of the polymer. The dopant may include an inorganic or organic anion, such as an ion of a sulfonic acid. In certain embodiments, the oxidative catalyst employed in the precursor solution has both a catalytic and doping functionality in that it includes a cation (e.g., transition metal) and anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron (III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron (III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from H. C. Starck GmbH under the designation Clevios™ C.

Various methods may be utilized to form the polymer on the metal substrate. In one embodiment, the oxidative catalyst and monomer are applied, either sequentially or together, such that the polymerization reaction occurs in situ on the part. Suitable application techniques may include screen-printing, dipping, electrophoretic coating, and spraying, may be used to form a polymer coating. As an example, the monomer may initially be mixed with the oxidative catalyst to form a precursor solution. Once the mixture is formed, it may be applied to the metal substrate and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The substrate may then be dried to remove the solvent therefrom. Thereafter, the substrate may be dipped into a solution containing the monomer. Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Publication No. 2008/232037 to Biler.

While chemical polymerization techniques may be employed in certain embodiments, it is often desired to minimize the use of oxidative catalysts in the capacitor as such materials can often lead to the formation of iron radicals (e.g., $Fe^{2+}$ or $Fe^{3+}$ ions). These radicals can, in turn, lead to dielectric degradation at the high voltages often employed during the use of the wet capacitor. Thus, anodic electrochemical polymerization techniques may be employed in certain embodiments to form the polymer. Such techniques generally employ a colloidal suspension that is generally free of iron-based oxidative catalysts. For instance, the colloidal suspension typically contains less than about 0.5 wt. %, in some embodiments, less than about 0.1 wt. %, and in some embodiments, less than about 0.05 wt. % (e.g., 0 wt. %) of such iron-based oxidative catalysts.

The colloidal suspension may be in the form of a macroemulsion, microemulsion, solution, etc. depending on the particular nature of the components of the suspension. Regardless, the suspension generally contains a solvent that serves as a continuous phase within which the precursor monomer is dispersed. Any of a variety of different solvents may be employed in the colloidal suspension, such as alcohols, glycols, water, etc. In one particular embodiment, the colloidal suspension is aqueous in nature. Solvents (e.g., water) may constitute from about 50 wt. % to about 99 wt. %, in some embodiments from about 70 wt. % to about 98 wt. % and in some embodiments, from about 80 wt. % to about 95 wt. %. The remaining components of the colloidal suspension (e.g., precursor monomers, surfactants, and sulfonic acids) may likewise constitute from about 1 wt. % to about 50 wt. %, in some embodiments from about 2 wt. % to about 30 wt. % and in some embodiments, from about 5 wt. % to about 20 wt. % of the colloidal suspension.

A surfactant may be employed in the colloidal suspension to form micelles that lead to an increase in solubility, forming a macroscopically or microscopically homogenous distribution of these micelles and the precursor monomer. The surfactant may be ionic (e.g., anionic, cationic, or zwitterionic) or nonionic in nature. The ionic surfactant may, for instance, be an anionic surfactant, such as a sulfonate (e.g., alkyl arylene sulfonates, α-olefin sulfonates, β-alkoxy alkane sulfonates, alkyllauryl sulfonates, alkyl monoglyceride sulfonates, alkyl ether sulfonates, etc.); sulfate (e.g., alkyl sulfates, alkyl aryl sulfates, alkyl ether sulfates, alkyl monoglyceride sulfates, etc.); sulfosuccinate; sarcosinate; etc., as well as derivatives, salts, polymers, and/or mixtures of the foregoing. Particular examples of ionic surfactants include, but are not limited to, $C_8$-$C_{30}$ alkyl sulfates, $C_8$-$C_{30}$ alkyl ether sulfates having one or two moles of ethoxylation, $C_8$-$C_{30}$ alkoyl sarcosinates, $C_8$-$C_{30}$ sulfoacetates, $C_8$-$C_{30}$ sulfosuccinates, $C_8$-$C_{30}$ alkyl diphenyl oxide disulfonates, $C_8$-$C_{30}$ alkyl carbonates, $C_8$-$C_{30}$ arylene sulfonates, etc. The $C_8$-$C_{30}$ alkyl group may be straight chain (e.g., dodecyl) or branched (e.g., 2-ethylhexyl). The cation of the ionic surfactant may be a proton, alkali metal (e.g., sodium or potassium), ammonium, $C_1$-$C_4$ alkylammonium (e.g., mono-, di-, tri-), or $C_1$-$C_3$ alkanolammonium (e.g., mono-, di-, tri). In one particular embodiment, for example, the anionic surfactant may be an alkyl benzenesulfonate having the following general structure:

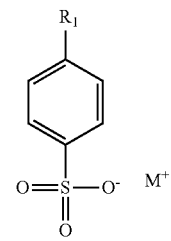

Wherein, $R_1$ is an alkyl group having from 8 to 30 carbon atoms, in some embodiments from 9 to 20, and in some embodiments, from 10 to 14 (e.g., 12) carbon atoms; and M is cation, such as hydrogen, a metal (e.g., sodium, potassium, lithium, etc.), ammonia ($NH_4^+$), etc. Comparable compounds with a naphthalene nucleus also can be used to form alkyl naphthalenesulfonates. Without intending to be limited by theory, it is believed that such alkyl arylene sulfonates are particularly effective in enhancing the surface coverage of the colloidal suspension on the substrate while also facilitating charge transport.

Of course, in addition to or in lieu of an anionic surfactant, cationic surfactants and/or zwitterionic surfactants may also be employed. Examples of cationic surfactants may include amino acids, alkyl amine salts, quaternary ammonium salts, pyridium salts, etc. For instance, suitable alkyl amine salts may include salts of primary or secondary amines having 3 to 22 carbon atoms, and carboxylic acid having 1 to 22 carbon atoms or inorganic mineral acid, such as dodecylamine acetate salt, dodecylamine hydrochloride salt, dodecylamine stearate salt, dodecylamine sulfonate, dimethylamine stearate salt, etc. In certain embodiments, such cationic surfactants may be formed in situ within the colloidal suspension through the addition of an amine (e.g., dodecylamine) and an acid, such as a sulfonic acid described below (e.g., toluene sulfonic acid).

Nonionic surfactants may also be employed. Such surfactants typically have a hydrophobic base, such as a long chain alkyl group or an alkylated aryl group, and a hydrophilic chain containing a certain number (e.g., 1 to about 30) of ethoxy and/or propoxy moieties. Although not necessarily require, nonionic surfactants having a certain hydrophilic/lipophilic balance ("HLB") value may help improve the stability of the colloidal suspension. The HLB index is well known in the art and is a scale that measures the balance between the hydrophilic and lipophilic solution tendencies of a compound with lower numbers representing highly lipophilic tendencies and the higher numbers representing highly hydrophilic tendencies. In some embodiments of the present invention, the HLB value of the nonionic surfactant is from about 5 to about 20, in some embodiments from about 10 to about 19 and in some embodiments, from about 11 to about 18. If desired, two or more surfactants may be employed that have HLB values either below or above the desired value, but together have an average HLB value within the desired range.

Suitable nonionic surfactants may include, for instance, polyoxyethylene chains as hydrophilic groups, polyglycerol fatty acid esters, polyglycerol fatty alcohol ethers, sucrose fatty acid esters, and hydrocarbyl polyglycosides. In one embodiment, the nonionic surfactant includes polyoxyethylene chains as hydrophilic groups and is selected from the group of polyoxyethylene fatty acid esters, polyoxyethylene fatty alcohol ethers, polyoxyethylene sorbitol anhydride fatty acid esters, polyoxyethylene glycerol mono fatty acid esters, polyoxyethylene hydrogenated castor oil and polyoxyethylene hydrogenated castor oil mono fatty acid esters, etc., as well as combinations thereof. Particularly suitable are polyoxyethylene fatty alcohol ethers in which the fatty alcohol forming the polyoxyethylene fatty alcohol ether is saturated or unsaturated, and has 8 to 22 carbon atoms (e.g., 8 to 14), and the polyoxyethylene structure moiety contains on average 4 to 60 ethylene oxide repeating units (e.g., 4 to 12). Examples of such surfactants include polyoxyethylene octyl ethers (e.g., polyoxyethylene-5 octyl ether), polyoxyethylene decyl ethers, polyoxyethylene lauryl ethers (e.g., polyoxyethylene-8 lauryl ether or polyoxyethylene-10-lauryl ether), polyoxyethylene myristyl ethers, polyoxyethylene palmityl ethers, polyoxyethylene isostearyl ethers, polyoxyethylene stearyl ethers, polyoxyethylene oleyl ethers, polyoxyethylene behenyl ethers, etc.

Regardless of its particular form, the surfactant can facilitate the formation of a colloidal suspension of monomer droplets. Without intending to be limited by theory, it is believed that such droplets can result in the formation of relatively small polymer units on the surface of the cathode substrate during anodic electrochemical polymerization. Such smaller polymer units can, in turn, result in a coating that is substantially uniform with excellent surface coverage. The size of the droplets depends in part on the nature of the suspension. "Microemulsions", for instance, may contains droplets having an average diameter of about 5 micrometers or less, in some embodiments about 4 micrometers or less, in some embodiments from about 10 nanometers to about 2 micrometers, and in some embodiments, from about 20 nanometers to about 1 micrometer. "Macroemulsions" may likewise contain droplets having a size of from about 5 to about 100 micrometers, and in some embodiments, from about 10 to about 80 micrometers. The term "diameter" can refer to the "hydrodynamic equivalent diameter" of a particle as determined using known techniques, such as photon correlation spectroscopy, dynamic light scattering, quasi-elastic light scattering, etc. These methods are generally based on the correlation of particle size with diffusion properties of particles obtained from Brownian motion measurements. Brownian motion is the random movement of the particles due to bombardment by the solvent molecules that surround the particles. The larger the particle, the more slowly the Brownian motion will be. Velocity is defined by the translational diffusion coefficient. The measured particle size value thus relates to how the particle moves within a liquid and is termed the "hydrodynamic diameter." Various particle size analyzers may be employed to measure the diameter in this manner. One particular example is a Cordouan VASCO 3 Particle Size Analyzer.

To help achieve the desired improvement in surface coverage, it is also generally desired that the concentration of the surfactant is selectively controlled within a certain range relative to the precursor monomers. For example, the ratio of the weight of surfactants to the weight of precursor monomers within the colloidal suspension may be from about 0.5 to about 1.5, in some embodiments from about 0.6 to about 1.4, and in some embodiments, from about 0.8 to about 1.2. Surfactants may, for instance, constitute from about 0.2 wt. % to about 10 wt. %, in some embodiments from about 0.5 wt. % to about 8 wt. %, and in some embodiments, from about 1 wt. % to about 5 wt. % of the colloidal suspension. The total concentration of monomers employed in the colloidal suspension may also be from about 0.1 wt. % to about 15 wt. %, in some embodiments from about 0.4 wt. % to about 10 wt. %, and in some embodiments, from about 0.5 wt. % to about 5 wt. % by weight of the colloidal suspension.

The colloidal suspension may also contain a sulfonic acid that can act as a secondary dopant to provide excess charge to the conductive polymer and stabilize its conductivity. Such acids may, for example, result in a colloidal suspension that has an electrical conductivity of from about 1 to about 100 milliSiemens per centimeter ("mS/cm"), in some embodiments from about 5 to about 60 mS/cm, and in some embodiments, from about 15 to about 50 mS/cm, determined at a temperature of 23° C. using any known electric conductivity meter (e.g., Oakton Con Series 11). The nature of the sulfonic acid, as wells as its relative concentration, may also be selectively controlled so that the pH level of the colloidal suspension is within a range of from about 2.0 to about 8.5, in some embodiments from about 3.0 to about 8.0, and in some embodiments, from about 5.0 to about 7.5. For example, the ratio of the weight of sulfonic acids to the weight of precursor monomers within the colloidal suspension is from about 0.2 to about 1.2, in some embodiments from about 0.4 to about 1.1, and in some embodiments, from about 0.6 to about 1.0. Likewise, the ratio of the weight of sulfonic acids to the weight of surfactants within the colloidal suspension is from about 0.2 to about 1.2, in some embodiments from about 0.3 to about 0.9, and in some embodiments, from about 0.4 to about 0.8.

The sulfonic acid is typically a low molecular weight organic-based monosulfonic acid, disulfonic acid, or trisulfonic acid. Specific examples of such acids include, for instance, alkylsulfonic acids (e.g., 2-acrylamide-2-methylpropanesulfonic acid, etc.); arylene sulfonic acids, such as benzenesulfonic acids (e.g., phenolsulfonic acid, styrenesulfonic acid, p-toluenesulfonic acid, dodecylbenzenesulfonic acid, etc.) and naphthalenesulfonic acids (e.g., 1-naphthalenesulfonic acid, 2-naphthalenesulfonic acid, 1,3-naphthalenedisulfonic acid, 1,3,6-naphthalenetrisulfonic acid, 6-ethyl-1-naphthalenesulfonic acid, etc.); anthraquinonesulfonic acids (e.g., anthraquinone-1-sulfonic acid, anthraquinone-2-sulfonic acid, anthraquinone-2,6-disulfonic acid, 2-methylanthraquinone-6-sulfonic acid, etc.); camphorsulfonic acids, as well as derivatives and mixtures thereof.

Arylene sulfonic acids are particularly suitable for use in the colloidal suspension, such as 1-naphthalenesulfonic acid, 2-naphthalenesulfonic acid, and/or p-toluenesulfonic acid. It should be understood that the term "sulfonic acid" as used herein also encompass salts of acids, such as those noted above, which can dissociate in an aqueous solution, such as sodium salts, lithium salts, potassium salts, etc. In one embodiment, for example, the sulfonic acid may be a sodium or potassium salt of 1-naphthalenesulfonic acid, 2-naphthalenesulfonic acid, and/or p-toluenesulfonic acid.

In addition to the components noted above, the colloidal suspension may also contain various other additives. For example, a defoaming agent may be employed in certain embodiments to reduce the degree of foam produced by the nonionic surfactant during the anodic electrochemical polymerization. Suitable defoaming agents may include, for instance, oils, esters, ethers, glycols, polysiloxanes, long chain oxygenated hydrocarbons (e.g., $C_6$ to $C_{12}$ alcohols), etc., as well as mixtures thereof. Particularly suitable defoaming agents are long chain oxygenated hydrocarbons, such as octanol, decanol and polyethylene glycols. When employed, such defoaming agents may constitute from about 0.01 wt. % to about 5 wt. %, in some embodiments from about 0.05 wt. % to about 4 wt. %, and in some embodiments, from about 0.1 wt. % to about 2 wt. % of the colloidal suspension. Besides defoaming agents, a wide variety of other additives may also be employed in the colloidal suspension.

To apply the colloidal suspension to the metal substrate, any of a variety of suitable application techniques may be employed, such as screen-printing, dipping, electrophoretic coating, spraying, etc. Regardless of how it is applied, the monomer within the colloidal suspension may be anodically electrochemically-polymerized to form a conductive polymer coating on the surface of the metal substrate. In one embodiment, for example, the metal substrate is dipped into a bath containing the colloidal suspension of the present invention. A pair of electrodes may be disposed within the bath for electrolysis. One electrode may be connected to the positive terminal of a power source and also in contact with the metal substrate. The other electrode may be connected to the negative terminal of the power source and an additional inert metal. During operation, the power source supplies a current feed to the electrodes in the electrochemical cell, thereby inducing electrolysis of the electrolyte and oxidative polymerization of the monomer in the colloidal suspension, or solution, onto the metal substrate. Anodic electrochemical polymerization is generally performed at ambient temperature to ensure that the colloidal suspension does not phase separate. For example, the colloidal suspension may be kept at a temperature of from about 15° C. to about 80° C., in some embodiments from about 20° C. to about 75° C., and in some embodiments, from about 25° C. to about 50° C. The amount of time in which the metal substrate is in contact with the colloidal suspension during anodic electrochemical polymerization may vary. For example, the metal substrate may be dipped into such a solution for a period of time ranging from about 10 seconds to about 10 minutes.

Regardless of the type of polymerization employed (e.g., chemical and/or anodic electrochemical), multiple polymerization steps may be repeated until the desired thickness of the coating is achieved. In one embodiment, for example, a chemically polymerized layer may be disposed directly on the metal substrate and an electrochemical polymerized layer may be disposed thereover, or vice versa. Regardless, the total target thickness of the coating may generally vary depending on the desired properties of the capacitor. Typically, the resulting conductive polymer coating has a thickness of from about 0.2 micrometers ("µm") to about 50 µm, in some embodiments from about 0.5 µm to about 20 µm, and in some embodiments, from about 1 µm to about 5 µm. It should be understood that the thickness of the coating is not necessarily the same at all locations on the substrate. Nevertheless, the average thickness of the coating on the substrate generally falls within the ranges noted above.

II. Anode

The anode of the electrolytic capacitor includes a porous body that may be formed from a valve metal composition. The specific charge of the composition may vary. In certain embodiments, for example, compositions having a high specific charge are employed, such as about 5,000 µF*V/g or more, in some embodiments about 25,000 µF*V/g or more, in some embodiments about 40,000 µF*V/g or more, and in some embodiments, from about 70,000 to about 300,000 µF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the porous anode body. In one embodiment, a tantalum or niobium oxide powder having a certain particle size is first selected. The particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode body, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, naphthalene, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. If desired, any binder/lubricant may be removed after compression, such as by heating the formed pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes.

The size of the pressed anode body may depend in part on the desired size of the metal substrate. In certain embodiments, the length of the anode body may range from about 1 to about 100 millimeters, in some embodiments from about 5 to about 60 millimeters, and in some embodiments, from about 5 to about 20 millimeters. The width (or diameter) of the anode body may also range from about 0.5 to about 20 millimeters, in some embodiments from about 1 to about 20 millimeters, and in some embodiments, from about 4 to about 10 millimeters. The shape of the anode body may also be selected to improve the electrical properties of the resulting capacitor. For example, the anode body may have a shape that is cylindrical, rectangular, D-shaped, curved, etc.

The anode body may be anodically oxidized ("anodized") so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

III. Working Electrolyte

The working electrolyte is a fluid that may be impregnated within the anode, or it may be added to the capacitor at a later stage of production. The fluid electrolyte generally uniformly wets the dielectric. Various suitable electrolytes are described in U.S. Pat. Nos. 5,369,547 and 6,594,140 to Evans, et al. Typically, the electrolyte is ionically conductive in that has an electrical conductivity of from about 0.1 to about 20 Siemens per centimeter ("S/cm"), in some embodiments from about 0.2 to about 10 S/cm, and in some embodiments, from about 0.5 to about 5 S/cm, determined at a temperature of about 23° C. using any known electric conductivity meter (e.g., Oakton Con Series 11). Within the ranges noted above, it is believed that the ionic conductivity of the electrolyte allows the electric field to extend into the electrolyte to a length (Debye length) sufficient to result in significant charge separation. This extends the potential energy of the dielectric to the electrolyte so that the resulting capacitor is able to store even more potential energy than predicted by the thickness of the dielectric. In other words, the capacitor may be charged to a voltage that exceeds the formation voltage of the dielectric. The ratio of the voltage to which the capacitor can be charged to the formation voltage may, for instance, be from about 1.0 to 2.0, in some embodiments from about 1.1 to about 1.8, and in some embodiments, from about 1.2 to about 1.6. As an example, the voltage to which the capacitor is charged may be from about 200 to about 350 V, in some embodiments from about 220 to about 320 V, and in some embodiments, from about 250 to about 300V.

The fluid electrolyte is generally in the form of a liquid, such as a solution (e.g., aqueous or non-aqueous), colloidal suspension, gel, etc. For example, the electrolyte may be an aqueous solution of an acid (e.g., sulfuric acid, phosphoric acid, or nitric acid), base (e.g., potassium hydroxide), or salt (e.g., ammonium salt, such as a nitrate), as well any other suitable electrolyte known in the art, such as a salt dissolved in an organic solvent (e.g., ammonium salt dissolved in a glycol-based solution). Various other electrolytes are described in U.S. Pat. Nos. 5,369,547 and 6,594,140 to Evans, et al.

The desired ionic conductivity may be achieved by selecting ionic compound(s) (e.g., acids, bases, salts, and so forth) within certain concentration ranges. In one particular embodiment, salts of weak organic acids may be effective in achieving the desired conductivity of the electrolyte. The cation of the salt may include monatomic cations, such as alkali metals (e.g., $Li^+$, $Na^+$, $K^+$, $Rb^+$, or $Cs^+$), alkaline earth metals (e.g., $Be^{2+}$, $Mg^{2+}$, $Ca^{2+}$, $Sr^{2+}$ or $Ba^{2+}$), transition metals (e.g., $Ag^+$, $Fe^{2+}$, $Fe^{3+}$, etc.), as well as polyatomic cations, such as $NH_4^+$. The monovalent ammonium ($NH_4^+$), sodium ($K^+$), and lithium ($Li^+$) are particularly suitable cations for use in the present invention. The organic acid used to form the anion of the salt is "weak" in the sense that it typically has a first acid dissociation constant ($pK_{a1}$) of about 0 to about 11, in some embodiments about 1 to about 10, and in some embodiments, from about 2 to about 10, determined at about 23° C. Any suitable weak organic acids may be used in the present invention, such as carboxylic acids, such as acrylic acid, methacrylic acid, malonic acid, succinic acid, salicylic acid, sulfosalicylic acid, adipic acid, maleic acid, mac acid, oleic acid, gallic acid, tartaric acid (e.g., dextrotartaric acid, mesotartaric acid, etc.), citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; blends thereof, and so forth. Polyprotic acids (e.g., diprotic, triprotic, etc.) are particularly desirable for use in forming the salt, such as adipic acid ($pK_{a1}$ of 4.43 and $pK_{a2}$ of 5.41), α-tartaric acid ($pK_{a1}$ of 2.98 and $pK_{a2}$ of 4.34), meso-tartaric acid ($pK_{a1}$ of 3.22 and $pK_{a2}$ of 4.82), oxalic acid ($pK_{a1}$ of 1.23 and $pK_{a2}$ of 4.19), lactic acid ($pK_{a1}$ of 3.13, $pK_{a2}$ of 4.76, and $pK_{a3}$ of 6.40), etc.

While the actual amounts may vary depending on the particular salt employed, its solubility in the solvent(s) used in the electrolyte, and the presence of other components, such weak organic acid salts are typically present in the electrolyte in an amount of from about 0.1 to about 25 wt. %, in some embodiments from about 0.2 to about 20 wt. %, in some embodiments from about 0.3 to about 15 wt. %, and in some embodiments, from about 0.5 to about 5 wt. %.

The electrolyte is typically aqueous in that it contains an aqueous solvent, such as water (e.g., deionized water). For example, water (e.g., deionized water) may constitute from about 20 wt. % to about 95 wt. %, in some embodiments from about 30 wt. % to about 90 wt. %, and in some embodiments, from about 40 wt. % to about 85 wt. % of the electrolyte. A secondary solvent may also be employed to form a solvent mixture. Suitable secondary solvents may include, for instance, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); and so forth. Such solvent mixtures typically contain water in an amount from about 40 wt. % to about 80 wt. %, in some embodiments from about 50 wt. % to about 75 wt. %, and in some embodiments, from about 55 wt. % to about 70 wt. % and secondary solvent(s) in an amount from about 20 wt. % to about 60 wt. %, in some embodiments from about 25 wt. % to about 50 wt. %, and in some embodiments, from about 30 wt. % to about 45 wt. %. The secondary solvent(s) may, for example, constitute from about 5 wt. % to about 45 wt. %, in some embodiments from about 10 wt. % to about 40 wt. %, and in some embodiments, from about 15 wt. % to about 35 wt. % of the electrolyte.

If desired, the electrolyte may be relatively neutral and have a pH of from about 4.5 to about 7.0, in some embodiments from about 5.0 to about 6.5, and in some embodiments, from about 5.5 to about 6.0. One or more pH adjusters (e.g., acids, bases, etc.) may be employed to help achieve the desired pH. In one embodiment, an acid is employed to lower the pH to the desired range. Suitable acids include, for instance, organic acids such as described above; inorganic acids, such as hydrochloric acid, nitric acid, sulfuric acid, phosphoric acid, polyphosphoric acid, boric acid, boronic acid, etc.; and mixtures thereof. Although the total concentration of pH adjusters may vary, they are typically present in an amount of from about 0.01 wt. % to about 10 wt. %, in some embodiments from about 0.05 wt. % to about 5 wt. %, and in some embodiments, from about 0.1 wt. % to about 2 wt. % of the electrolyte.

The electrolyte may also contain other components that help improve the electrical performance of the capacitor. For instance, a depolarizer may be employed in the electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte. Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroace tophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth.

The particular manner in which the components are incorporated into the capacitor is not critical and may be accomplished using a variety of techniques. Referring to FIG. 1, for example, one embodiment of an electrolytic capacitor 40 is shown that includes a working electrolyte 44 disposed in electrical communication with an anode 20 and a cathode 43 formed in accordance with the present invention. The cathode 43 may generally be formed from an abrasive blasted substrate 41 that is applied with a conductive coating 49. In the illustrated embodiment, the substrate 41 forms a casing having a generally cylindrical shape. It should be understood, however, that any geometric configuration may be employed in the present invention, such as rectangular, triangular, prismatic, etc. The casing may optionally include a lid that covers the anode and electrolyte, which may be formed from the same or different material than the casing.

A seal 23 (e.g., glass-to-metal) may also be employed that connects and seals the anode 20 to the cathode 43. An electrically insulating bushing 89 (e.g., polytetrafluoroethylene ("PTFE")) and/or support 91 may also be employed to help stabilize the anode 20 and lead 42 and maintain the desired spacing within the capacitor. If desired, a separator (not shown) may also be positioned between the cathode 43 and anode 20 to prevent direct contact between the anode and cathode. Examples of suitable materials for this purpose include, for instance, porous polymer materials (e.g., polypropylene, polyethylene, polycarbonate, etc.), porous inorganic materials (e.g., fiberglass mats, porous glass paper, etc.), ion exchange resin materials, etc. Particular examples include ionic perfluoronated sulfonic acid polymer membranes (e.g., Nafion™ from the E.I. DuPont de Nemeours & Co.), sulphonated fluorocarbon polymer membranes, polybenzimidazole (PBI) membranes, and polyether ether ketone (PEEK) membranes. To optimize the volumetric efficiency of the capacitor, it is generally desired that the separator has a relatively small thickness. For example, the thickness of the separator, when employed, typically ranges from about 5 to about 250 micrometers, in some embodiments from about 10 to about 150 micrometers, and in some embodiments, from about 15 to about 100 micrometers.

The lid or casing may define an internal orifice through which extends a conductive tube 56 that is generally hollow and of a size and shape sufficient to accommodate an anode lead. The conductive tube 56 is typically formed from a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. During and/or after assembly and sealing (e.g., welding), the electrolyte may be introduced into the casing through a fill-port. Filling may be accomplished by placing the capacitor in a vacuum chamber so that the fill-port extends into a reservoir of the electrolyte. When the chamber is evacuated, pressure is reduced inside the capacitor. When the vacuum is released, pressure inside the capacitor re-equilibrates, and the electrolyte is drawn through the fill-port into the capacitor.

Regardless of its particular configuration, the capacitor of the present invention may exhibit excellent electrical properties. For example, the capacitor may exhibit a high volumetric efficiency, such as from about 50,000 $\mu F*V/cm^3$ to about 300,000 $\mu F*V/cm^3$, in some embodiments from about 60,000 $\mu F*V/cm^3$ to about 200,000 $\mu F*V/cm^3$, and in some embodiments, from about 80,000 $\mu F*V/cm^3$ to about 150,000 $\mu F*V/cm^3$, determined at a frequency of 120 Hz and at room temperature (e.g., 25° C.). Volumetric efficiency is determined by multiplying the formation voltage of a part by its capacitance, and then dividing by the product by the volume of the part. For example, a formation voltage may be 175 volts for a part having a capacitance of 520 $\mu F$, which results in a product of 91,000 $\mu F*V$. If the part occupies a volume of about 0.8 $cm^3$, this results in a volumetric efficiency of about 113,750 $\mu F*V/cm^3$.

The capacitor may also exhibit a high stored energy that enables it suitable for use in high pulse applications. Energy is generally determined according to the equation $E=\frac{1}{2}*CV^2$, where C is the capacitance in farads (F) and V is the working voltage of capacitor in volts (V). The capacitance may, for instance, be measured using a capacitance meter (e.g., Keithley 3330 Precision LCZ meter with Kelvin Leads, 2 volts bias and 1 volt signal) at operating frequencies of from 10 to 120 Hz (e.g., 120 Hz) and a temperature of about 23° C. For example, the capacitor may exhibit a stored energy of about 2.0 joules per cubic centimeter ($J/cm^3$) or more, in some embodiments about 3.0 $J/cm^3$, in some embodiments from about 3.5 $J/cm^3$ to about 10.0 $J/cm^3$, and in some embodiments, from about 4.0 to about 8.0 $J/cm^3$. The capacitance may likewise be about 1 milliFarad per square centimeter ("$mF/cm^2$") or more, in some embodiments about 2 $mF/cm^2$ or more, in some embodiments from about 5 to about 50 $mF/cm^2$, and in some embodiments, from about 8 to about 20 $mF/cm^2$. The capacitor may also exhibit a relatively high "breakdown voltage" (voltage at which the capacitor fails), such as about 180 volts or more, in some embodiments about 200 volts or more, and in some embodiments, from about 210 volts to about 260 volts.

The equivalent series resistance ("ESR")—the extent that the capacitor acts like a resistor when charging and discharging in an electronic circuit—may also be less than about 15,000 milliohms, in some embodiments less than about 10,000 milliohms, in some embodiments less than about 5,000 milliohms, and in some embodiments, from about 1 to about 4,500 milliohms, measured with a 2-volt bias and 1-volt signal at a frequency of 120 Hz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 $\mu A/pPV$, in some embodiments less than about 0.5 $\mu A/\mu F*V$, and in some embodiments, less than about 0.1 $\mu A/\mu F*V$, where $\mu A$ is microamps and $\mu F*V$ is the product of the rated capacitance and the rated voltage. Leakage current may be measured using a leakage test meter (e.g., MC 190 Leakage test, Mantracourt Electronics LTD, UK) at a temperature of about 23° C. and at a certain rated voltage after a charging time of from about 60 to about 300 seconds. Such ESR and normalized leakage current values may even be maintained after aging for a substantial amount of time at high temperatures. For example, the values may be maintained for about 100 hours or more, in some embodiments from about 300 hours to about 2500 hours, and in some embodiments, from about 400 hours to about 1500 hours (e.g., 500 hours, 600 hours, 700 hours, 800 hours, 900 hours, 1000 hours, 1100 hours, or 1200 hours) at temperatures ranging from about 100° C. to about 250° C., and, in some embodiments from about 100° C. to about 200° C. (e.g., 100° C., 125° C., 150° C., 175° C., or 200° C.).

The electrolytic capacitor of the present invention may be used in various applications, including but not limited to medical devices, such as implantable defibrillators, pacemakers, cardioverters, neural stimulators, drug administering devices, etc.; automotive applications; military applications, such as RADAR systems; consumer electronics, such as radios, televisions, etc.; and so forth. In one embodiment, for example, the capacitor may be employed in an implantable medical device configured to provide a therapeutic high voltage (e.g., between approximately 500 volts and approximately 850 volts, or, desirably, between approximately 600 Volts and approximately 900 volts) treatment for a patient. The device may contain a container or housing that is hermetically sealed and biologically inert. One or more leads are electrically coupled between the device and the patient's heart via a vein. Cardiac electrodes are provided to sense cardiac activity and/or provide a voltage to the heart. At least a portion of the leads (e.g., an end portion of the leads) may be provided adjacent or in contact with one or more of a ventricle and an atrium of the heart. The device may also contain a capacitor bank that typically contains two or more capacitors connected in series and coupled to a battery that is internal or external to the device and supplies energy to the capacitor bank. Due in part to high conductivity, the capacitor of the present invention can achieve excellent electrical properties and thus be suitable for use in the capacitor bank of the implantable medical device.

The present invention may be better understood by reference to the following prophetic examples.

Example 1

Cylindrical tantalum cans were blasted with a handheld, pen-type blasting gun having a blasting nozzle of 1 mm (internal diameter). The blasting media was manganese dioxide having an average size of about 60-230 Mesh and a purity of greater than 99%. The carrier gas was argon and the blasting pressure was 0.5 MPa. After blasting, loose blasting media was removed by blowing with compressed air and then subjecting the can to ultrasonic cleaning in warm deionized water (about 5 min at 40° C.). Cans were then subjected to chemical stripping of any embedded $MnO_2$ media using a stripping solution containing 1800 ml of hydrogen peroxide (20 vol. %), 400 ml of analar nitric acid, and 2200 ml of deionized water. The stripping time was approximately 2 hours. After stripping, the cans were then washed in 80° C. deionized water and dried at 80° C. The content of tantalum, manganese, and oxygen was then determined on the surface of the cans. The results are set forth below.

|    | Initial Content | After Blasting | After Ultrasonic Cleaning | After Stripping | After Hot Water Wash (Final) |
|----|-----------------|----------------|---------------------------|-----------------|------------------------------|
| Ta | 97.4            | 28.4           | 51.4                      | 92.5            | 95.6                         |
| Mn | —               | 35.6           | 20.8                      | 1.5             | 0.5                          |
| O  | 2.6             | 36.0           | 27.9                      | 6.0             | 3.9                          |

As indicated, the resulting cans have a tantalum-rich surface containing approximately 95.6% tantalum.

If desired, the cans may be subjected to a deoxidation treatment to even further minimize the presence of oxygen in the tantalum-rich surface. For example, cans embedded in magnesium chips (1 mm) may be heated to 960° C. under argon and held for 120 minutes, switched to vacuum and held for 90 minutes, and cooled. The cans may then be cleaned using a stripping solution to remove MgO.

Also, a conductive coating may be formed on the tantalum-rich surface of the cans by, for example, dipping them into a butanol solution of iron (III) toluenesulfonate (Clevios™ C, H.C. Starck) for five (5) minutes and subsequently into 3,4-ethylenedioxythiophene (Clevios™ M, H.C. Starck) for five (5) minutes. The cans may then be drained using a vacuum for up to one (1) minute, and put into a drying oven for 45 minutes at 30° C. The resulting poly(3,4-ethylenedioxythiophene) may be washed in methanol to remove reaction by-products for five (5) minutes and the tantalum cans may be put into a drying oven for five (5) minutes at 85° C. This polymerization cycle may be repeated four (4) times.

Prophetic Example 1

Cylindrical tantalum cans with a size of 18.3 mm (length)× 9.1 mm (internal diameter) may be blasted with a JetStreem Blaster II (SCM System, Inc.). The blasting media may be, for example, manganese dioxide having an average size of about 74 micrometers (200 Mesh). The media flow rate may be 0.5 grams per second via a 3.2-millimeter blasting nozzle. All pieces of cylindrical tantalum cans may be blasted to a control level 10.7 millimeters (from potential 18.3 millimeters) using appropriate ferrules. The blasting time may be 5, 10, 15, or 20 seconds. The samples may then be degreased in water with surfactants in an ultrasonic bath for 5 minutes, rinsed 3 times in an extraction solution containing deionized water, nitric acid, and hydrogen peroxide, and then dried at a temperature of 85° C. for 5 minutes. Thereafter, a conductive coating may be formed as described above.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for forming a cathode of a wet electrolytic capacitor, the method comprising:

blasting a metal substrate with a plurality of abrasive particles to form a micro-roughened surface having a plurality of pits;

contacting the micro-roughened surface of the metal substrate with an extraction solution, wherein the abrasive particles are dispersed in the extraction solution;

subjecting the micro-roughened surface of the metal substrate to a deoxidation treatment; and thereafter, forming a conductive coating on the micro-roughened surface.

2. The method of claim 1, wherein the abrasive particles include ceramic particles.

3. The method of claim 1, wherein the abrasive particles are conductive.

4. The method of claim 3, wherein the abrasive particles include manganese dioxide.

5. The method of claim 1, wherein the abrasive particles have an average size of from about 25 to about 200 micrometers.

6. The method of claim 1, wherein the pits have an average depth of from about 200 to about 2500 nanometers and/or a peak-to-peak distance that ranges from about 30 to about 400 micrometers.

7. The method of claim 1, wherein the abrasive particles are propelled at a pressure of from about 10 to about 35 pounds per square inch for a time of from about 10 to about 30 seconds.

8. The method of claim 1, wherein the abrasive particles are dissolved in the extraction solution.

9. The method of claim 1, wherein the extraction solution contains water.

10. The method of claim 1, wherein the extraction solution contains an inorganic acidic compound, inorganic basic compound, or both.

11. The method of claim 1, wherein after contact with the extraction solution, only about 25% or less of the micro-roughened surface is defined by the abrasive particles.

12. The method of claim 1, wherein from about 90% to about 99.95% of the surface of the substrate is defined by a material of the metal substrate.

13. The method of claim 1, wherein the metal substrate comprises titanium, tantalum, steel, or a combination thereof.

14. The method of claim 12, wherein the metal substrate comprises tantalum, and wherein from about 90% to about 99.95% of the surface of the substrate is tantalum.

15. The method of claim 1, wherein the surface of the metal substrate contains only about 5% or less of oxygen.

16. The method of claim 1, wherein the conductive coating includes a conductive polymer.

17. The method of claim 16, wherein the conductive polymer includes an optionally substituted poly(3,4-ethylenedioxythiophene).

18. The method of claim 16, wherein the conductive polymer is formed an anodic electrochemical polymerization of a colloidal suspension.

19. A wet electrolytic capacitor comprising:

a porous anode body that contains a dielectric layer formed by anodic oxidation;

a fluid working electrolyte;

a cathode comprising a metal substrate, wherein the metal substrate of the cathode defines a micro-roughened interior surface that contains a plurality of pits formed by blasting with manganese dioxide abrasive particles, wherein only about 15% or less of the surface is defined by the abrasive particles; and a conductive polymer coating disposed on the interior surface of the substrate.

20. The wet electrolytic capacitor of claim 19, wherein the metal substrate is generally cylindrical.

21. The wet electrolytic capacitor of claim 19, wherein the porous anode body comprises tantalum, niobium, or an electrically conductive oxide thereof.

22. The wet electrolytic capacitor of claim 19, wherein only about 0.05% to about 10% of the surface is defined by the abrasive particles.

23. The wet electrolytic capacitor of claim 19, wherein the abrasive particles have an average size of from about 25 to about 200 micrometers.

24. The wet electrolytic capacitor of claim 19, wherein the pits have an average depth of from about 200 to about 2500 nanometers and/or a peak-to-peak distance that ranges from about 30 to about 400 micrometers.

25. The wet electrolytic capacitor of claim 19, wherein the metal substrate comprises titanium, tantalum, steel, or a combination thereof.

26. The wet electrolytic capacitor of claim 19, wherein the surface of the metal substrate contains only about 5% or less of oxygen.

27. The wet electrolytic capacitor of claim 19, wherein the conductive polymer coating includes an optionally substituted poly(3,4-ethylenedioxythiophene).

* * * * *